United States Patent
Coglitore

(10) Patent No.: US 10,282,865 B2
(45) Date of Patent: May 7, 2019

(54) METHOD AND APPARATUS FOR PRESENTING IMAGERY WITHIN A VIRTUALIZED ENVIRONMENT

(71) Applicant: R-STOR INC., Saratoga, CA (US)

(72) Inventor: Giovanni Coglitore, Saratoga, CA (US)

(73) Assignee: R-STOR INC., Saratoga, CA (US)

( * ) Notice: Subject to any disclaimer, the term of this patent is extended or adjusted under 35 U.S.C. 154(b) by 0 days.

(21) Appl. No.: 15/485,863

(22) Filed: Apr. 12, 2017

(65) Prior Publication Data
US 2017/0294030 A1  Oct. 12, 2017

Related U.S. Application Data

(60) Provisional application No. 62/321,528, filed on Apr. 12, 2016.

(51) Int. Cl.
| | |
|---|---|
| *G06T 11/00* | (2006.01) |
| *G06T 7/70* | (2017.01) |
| *G06F 3/01* | (2006.01) |
| *G06T 19/00* | (2011.01) |

(52) U.S. Cl.
CPC .............. *G06T 11/00* (2013.01); *G06F 3/011* (2013.01); *G06T 7/70* (2017.01); *G06T 19/00* (2013.01)

(58) Field of Classification Search
None
See application file for complete search history.

(56) References Cited

U.S. PATENT DOCUMENTS

| | | | |
|---|---|---|---|
| 2008/0043022 A1* | 2/2008 | Ishihara | A63F 13/10 345/428 |
| 2012/0249741 A1* | 10/2012 | Maciocci | G06F 3/011 348/46 |
| 2012/0264510 A1 | 10/2012 | Wigdor et al. | |
| 2013/0328928 A1* | 12/2013 | Yamagishi | G02B 27/017 345/633 |
| 2017/0278304 A1* | 9/2017 | Hildreth | G02B 27/0172 |

OTHER PUBLICATIONS

International Search Report and Written Opinion International Application No. PCT/US2017/027189 dated Aug. 22, 2017.

* cited by examiner

*Primary Examiner* — Jwalant Amin
(74) *Attorney, Agent, or Firm* — Squire Patton Boggs (US) LLP

(57) ABSTRACT

Certain embodiments may relate to presenting imagery within a virtualized environment. A method and apparatus may be provided. The method may include generating a virtualized environment for a user. The method may also include detecting an object in the real world. The method may further include rendering imagery corresponding to the detected object in the virtualized environment.

15 Claims, 7 Drawing Sheets

METHOD AND APPARATUS FOR PRESENTING IMAGERY WITHIN A VIRTUALIZED ENVIRONMENT

CROSS REFERENCE TO RELATED APPLICATION

This application claims priority to U.S. Provisional Application No. 62/321,528 filed on Apr. 12, 2016. The entire contents of the above-referenced provisional application in hereby incorporated by reference.

BACKGROUND

Field

Certain embodiments of the present invention may relate to presenting imagery within a virtualized environment.

Description of the Related Art

Virtual reality may generate/simulate a physical environment. Users of the virtual reality may interact within the simulated virtualized environment. The imagery of the virtualized environment may be displayed via a computer screen or via a headset. The virtualized environment may resemble physical locations in the real world or may resemble locations of an imaginary world.

SUMMARY

According to a first embodiment, a method may include generating, by a virtual reality device, a virtualized environment for a user. The method may also include detecting an object in the real world. The method may also include rendering imagery corresponding to the detected object in the virtualized environment.

In the method of the first embodiment, the generating the virtualized environment includes using real-world imagery.

In the method of the first embodiment, the method may also include capturing real-world imagery of the object in the real world. The rendering the imagery corresponding to the detected object comprises using the captured real-world imagery.

In the method of the first embodiment, the detecting the object comprises determining a distance between the user and the object.

In the method of the first embodiment, the rendering the imagery corresponding to the detected object is based on the determined distance between the user and the object. The rendered imagery is more pronounced when the determined distance is smaller.

In the method of the first embodiment, the method may also include providing an alert that the detected object is within a predetermined distance from the user.

According to a second embodiment, an apparatus may include at least one processor. The apparatus may also include at least one memory including computer program code. The at least one memory and the computer program code may be configured, with the at least one processor, to cause the apparatus at least to generate a virtualized environment for a user. The apparatus may also be caused to detect an object in the real world. The apparatus may also be caused to render imagery corresponding to the detected object in the virtualized environment.

In the apparatus of the second embodiment, the generating the virtualized environment comprises using real-world imagery.

In the apparatus of the second embodiment, the apparatus is further caused to capture real-world imagery of the object in the real world. The rendering the imagery corresponding to the detected object comprises using the captured real-world imagery.

In the apparatus of the second embodiment, the detecting the object includes determining a distance between the user and the object.

In the apparatus of the second embodiment, the rendering the imagery corresponding to the detected object is based on the determined distance between the user and the object. The rendered imagery is more pronounced when the determined distance is smaller.

In the apparatus of the second embodiment, the apparatus is further caused to provide an alert that the detected object is within a predetermined distance from the user.

According to a third embodiment, a computer program product may be embodied on a non-transitory computer readable medium. The computer program product configured to control a processor to perform a method according to the first embodiment.

BRIEF DESCRIPTION OF THE DRAWINGS

For proper understanding of the invention, reference should be made to the accompanying drawings, wherein.

DETAILED DESCRIPTION

Figure 1:
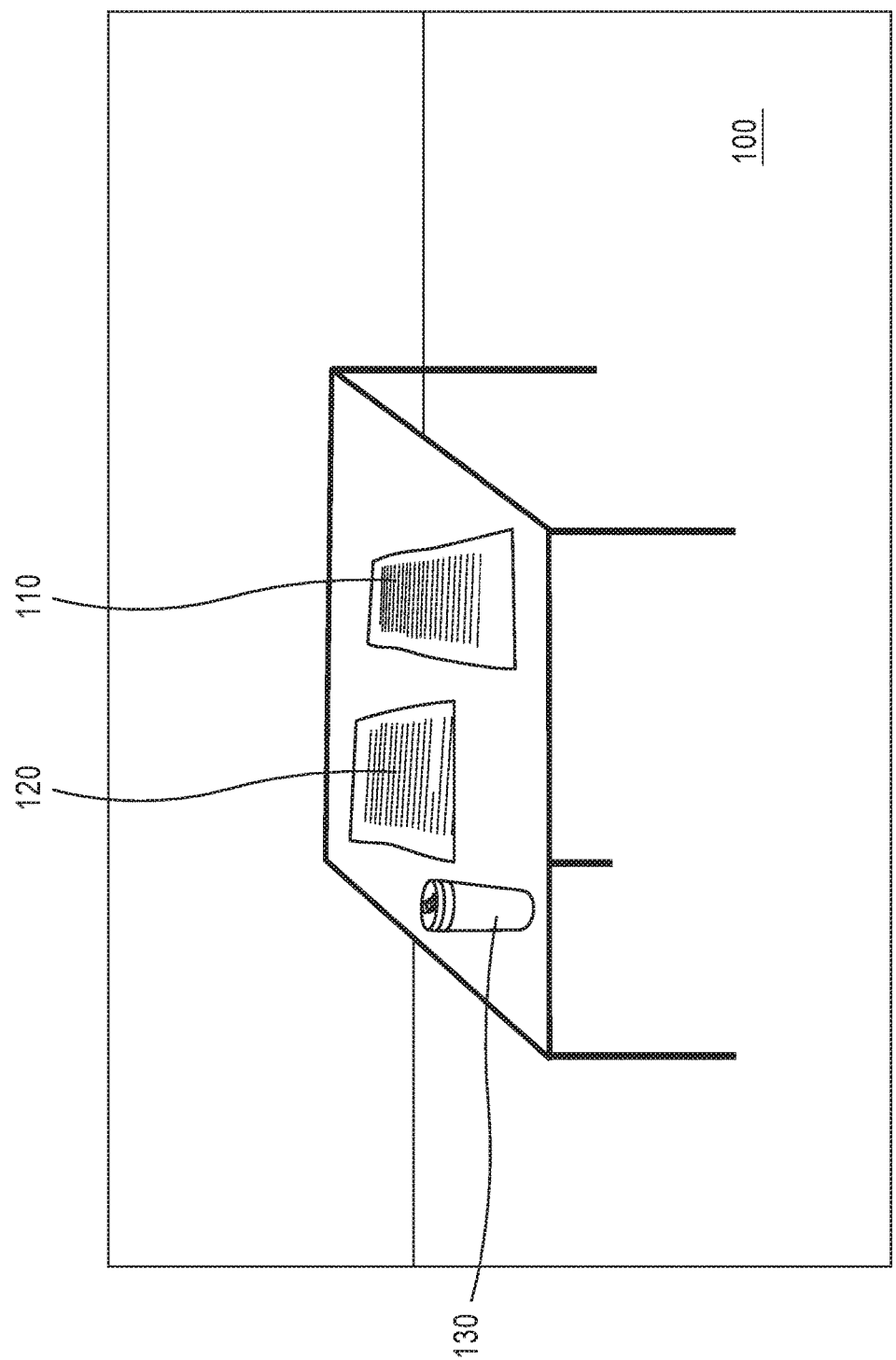
FIG. 1 illustrates presenting imagery within a virtualized environment, in accordance with certain embodiments of the present invention.

Certain embodiments of the present invention may relate to presenting imagery within a virtualized environment. Certain embodiments may present the imagery by merging imagery corresponding to a real-world object with imagery of the virtualized environment. As described in further detail below, the imagery corresponding to the real-world object may be computer-generated imagery or may be captured video/imagery of the object. As described in further detail below, the imagery corresponding to the virtualized environment may also be computer-generated imagery or may be actual captured video/imagery.

With certain embodiments, in order to interact with the virtualized environment, a user of the virtualized environment may utilize hardware which simulates/generates the virtualized environment for the user. For example, the user may be wearing a virtual-reality headset or eyewear that generates the virtualized environment. The user may also use a projection hardware that simulates/generates the virtualized environment.

By using the hardware (such as a headset), the user may be immersed within a virtualized environment that is different than the real-world environment that the user is currently existing within. Although the virtualized environment may be different than the real-world environment that the user is currently existing within, portions of the imagery of the virtualized environment may use captured real-world imagery. For example, a user in Chicago may decide to be immersed in a virtualized environment that is, for example, a Hawaiian beach. The hardware may generate the virtualized Hawaiian beach by using real-world video/imagery, such as real-life footage/photos of a Hawaiian beach. Therefore, one or more portions of a virtualized environment may include real-world video/imagery. Other portions of the virtualized environment may include computer-generated imagery (i.e., imagery that is not real-life video footage or real-life pictures). For example, the virtualized Hawaiian beach may include a computer-generated bird or other computer-generated object.

In view of the above, certain embodiments may allow a user to be immersed in any virtualized environment that the user desires. The environment may be generated using real-life footage/imagery, computer-generated imagery, or any combination of the two, as described above. As such, a user may decide to use the headset to generate a virtualized environment corresponding to a real-life beach in Hawaii, a real-life London bar, a fictional location, and/or any other desired location.

With certain embodiments, the imagery corresponding to the real-world objects may be imagery of objects that are in the vicinity of the user, within the real world. For example, when the user's hand touches a real-world object in the real world, then imagery corresponding to the real-world object may appear in the virtualized environment. The imagery corresponding to the real-world object may be real-world video footage/pictures of the object, a computer-generated representation of the object, or a combination of the two.

For example, if a user interacts with a real-world keyboard, certain embodiments may then generate imagery corresponding to the real-world keyboard. As such, as the user types on the actual real-world keyboard, within the virtualized environment, the user will also be shown as typing on a generated keyboard. The generated imagery of the real-world keyboard may include real-world video footage/pictures of the keyboard, a computer-generated representation of the keyboard, or a combination of the two.

As such, while the user is typing on a generated object within the virtualized environment, the user may experience the tactile sensation of the actual, real-world object, in the real world. Specifically, while the user is typing on a generated keyboard in the virtualized environment, the user may experience the tactile sensation of using an actual, real-world keyboard, in the real world.

In view of the above, with certain embodiments, a user may be able to use a computer by merely interacting with a real-world keyboard to receive the tactile sensation of the keyboard, without requiring other computer components that would typically be necessary. For example, a real-world monitor (and the displayed information on the monitor in the real-world) may be unnecessary because a monitor may be generated/rendered within the virtualized environment.

As such, in the course of generating/rendering a monitor in the virtualized environment, the user can choose among different types of rendered monitors/displays, in accordance to whatever form factor that the user desires. For example, the user may choose to use a 20-inch monitor, a 30-inch monitor, a 40-inch monitor, etc. These different displays/monitors may be rendered by the headset in the virtualized environment.

Although keyboards have been specifically mentioned as one example of a real-world object that the user can come in contact with, other example real-world objects may include other objects such as a computer mouse, an electronic device, a game controller, documents, and/or any other physical prop, for example.

For example, with certain embodiments, a user may be playing a video game while being immersed within the virtualized environment. Suppose the computer game may be a first-person shooter computer game. When playing such a game, the user may hold a fake gun/controller in the real world in order to experience a tactile sensation while operating a gun in the virtualized world. As the user is interacting with a virtual gun in the virtualized environment, the user may interact with a prop/controller in the real world. Therefore, as the user sees and interacts with a virtual/generated gun in the virtualized world of the first-person shooter game, the user will also experience a tactile response as the user touches the real-world prop/controller, in the real world.

With another embodiment, the hardware/headset may be configured with sensors to detect real-world objects, obstacles, or persons. Once an object, obstacle, or person is detected in the real world, certain embodiments may then generate imagery corresponding to the real-world objects, obstacles, or persons, where the generated imagery is then merged with the virtualized environment. For example, the sensors of the headset may detect that a person is approaching the user, or that the user is approaching a person, in the real world. In another example, the sensors of the headset may determine that the user is nearing an obstacle.

Once the sensors determine that an obstacle, object, or person is in the vicinity of the user, the headset may alert the user of the obstacle, object, or person. This alert may be a useful alert to the users because these users are typically totally immersed within the virtual environment, and thus they cannot sense nearby obstacles, objects, or persons that are in the real world. By providing these useful alerts to the user, certain embodiments may allow the user to avoid bumping into obstacles, objects, or persons, and may allow the user to be less disoriented by these obstacles, objects, or persons. With certain embodiments, the headset may provide an alert to the user if someone is approaching the user, or if the user is about to bump into an obstacle/object/person.

With certain embodiments, in addition to determining that an obstacle, object, or person is in the vicinity of the user, the sensors can also specifically identify the different object, obstacle, or person that the user may come in contact with within the real world. For example, with one embodiment, once an optical sensor detects the presence of an object, the sensor may then determine the physical characteristics/dimensions of the detected object. Next, a controller of the hardware may refer to stored information of a set of objects to determine if the detected object matches any of the objects of the stored information. The stored information may correspond to objects that are recognizable by embodiments of the present invention. For example, certain embodiments may store information regarding the recognizable objects within a database.

With another embodiment, the hardware may detect/identify objects within the real world, when the objects transmit communication to the hardware. The real-world objects may use communication methods that are compatible with the hardware/headset. As such, a real-world object may be detected by the headset after the object notifies the headset of the object's existence, and the object may identify itself to the headset. For example, the object may inform the headset of the object's type, the object's location, and any other characteristics of the object. With certain embodiments, the real-world objects may communicate with the headset via Bluetooth communication.

With certain embodiments, the sensors or other cameras may capture real-world footage/images of real-world objects. After the real-world footage/images are captured, certain embodiments may render imagery corresponding to the real-world objects. The rendered imagery may use the captured, actual, real-world footage/images.

Therefore, after certain embodiments may perform optical recognition or capture of objects in the real-world environment of the user, then imagery corresponding to the real-world objects may be inserted into the virtualized environment.

FIG. 1 illustrates presenting imagery within a virtualized environment, in accordance with certain embodiments of the present invention. In the example of FIG. 1, a user may be immersed within a virtualized environment 100. While the user is immersed within virtual environment 100, certain embodiments may generate imagery corresponding to a real-world object. This generated imagery may then be merged within virtualized environment 100. For example, the user may wish to look at a piece of paper (where the piece of paper is in the real-world environment). The headset may render a live video stream 120 or may render a real-world image 110 of one or more pieces of paper within virtualized environment 100. As such, the user is able to look at documents (110, 120) within virtualized environment 100, where the documents exist within the real world of the user. Although documents in the real-world environment are specifically mentioned as an example object that may be rendered in the virtualized environment, other objects (such as a soft-drink can in the real world) may be rendered as real-world imagery 130 within the virtualized environment 100.

In view of the above, certain embodiments of the present invention may combine imagery of the virtual world with imagery of the real world. The imagery of the real-world may include either pictures or footage of the real world.

As described above, different objects of the real world that the user interacts with may be rendered in the virtualized environment. However, as imagery corresponding to the real-world objects is generated within the virtualized environment, the background of the real-world environment is ignored by the hardware. For example, as described above, the real-world environment may be replaced by a desired virtualized environment (such as a virtual London bar, a virtual Hawaiian beach, etc.). As such, certain embodiments may ignore the background of the user's real-world environment, while rendering certain objects of the real-world environment.

In view of the above, certain embodiments detect the presence of an object in the real world. Next, the detected objects may be identified. Certain embodiments may then separate the identified objects from the background of the real-world environment. For example, the imagery of the identified objects may be separated from the imagery of the real-world background. Certain embodiments may then insert only the imagery of the real-world object into the virtualized environment. Therefore, the surrounding reality of the real-world environment may be eliminated, while the desired real-world objects are rendered properly within the virtualized environment.

Certain embodiments may also implement a gradual introduction of real-world objects, persons, and obstacles into the virtual environment. Specifically, certain embodiments may gradually introduce imagery of a real-world object, based upon a distance between the user and the real-world object, in the real-world. By introducing a real-world object gradually into the virtualized environment, the introduction may appear less intrusive to the user.

Introducing real-world objects into the virtual environment may be helpful to the user because, when the user is using a virtual reality headset, the user may become less aware of surrounding objects, obstacles, and other people. In other words, once the user is plugged into the virtual reality headset, the user may lose much of their sensory capability. As such, certain embodiments may provide the user with the ability to sense that somebody is coming into the vicinity of the user. Further, by introducing the real-world object/person gradually into the virtualized environment, the introduction may be less disorienting to the user of the virtualized environment.

When gradually introducing imagery of a real-world object, person, and/or obstacle, certain embodiments may introduce imagery based upon whether different distance thresholds are met. With certain embodiments, a hardware controller or computer processor may introduce imagery based on stored/predetermined distance thresholds. For example, suppose different threshold distances exist, where $d_1 < d_2 < d_3$. Although three distance thresholds ($d_1$, $d_2$, and $d_3$) are specifically mentioned, other embodiments may use more or fewer distance thresholds. These thresholds may correspond to the distance between a user and an object, person, and/or obstacle in the real world. Therefore, as an object, person, and/or obstacle continues to approach the user (or as the user approaches the object, person, and/or obstacle) and crosses the different distance thresholds, the generated imagery of the object, person, and/or obstacle becomes more and more pronounced to the user.

For example, suppose a person/obstacle is initially far away from the user that is using the headset. First, if the headset determines that a person or other obstacle arrives within distance $d_3$ of the user, the headset can first provide the user with a physical indication that a person/obstacle has entered within distance $d_3$ of the user. For example, the headset can provide a buzzing or rumbling sensation to the user. This physical indication may be considered to be an alert that is the least pronounced, that is, the least intrusive.

Figure 2:
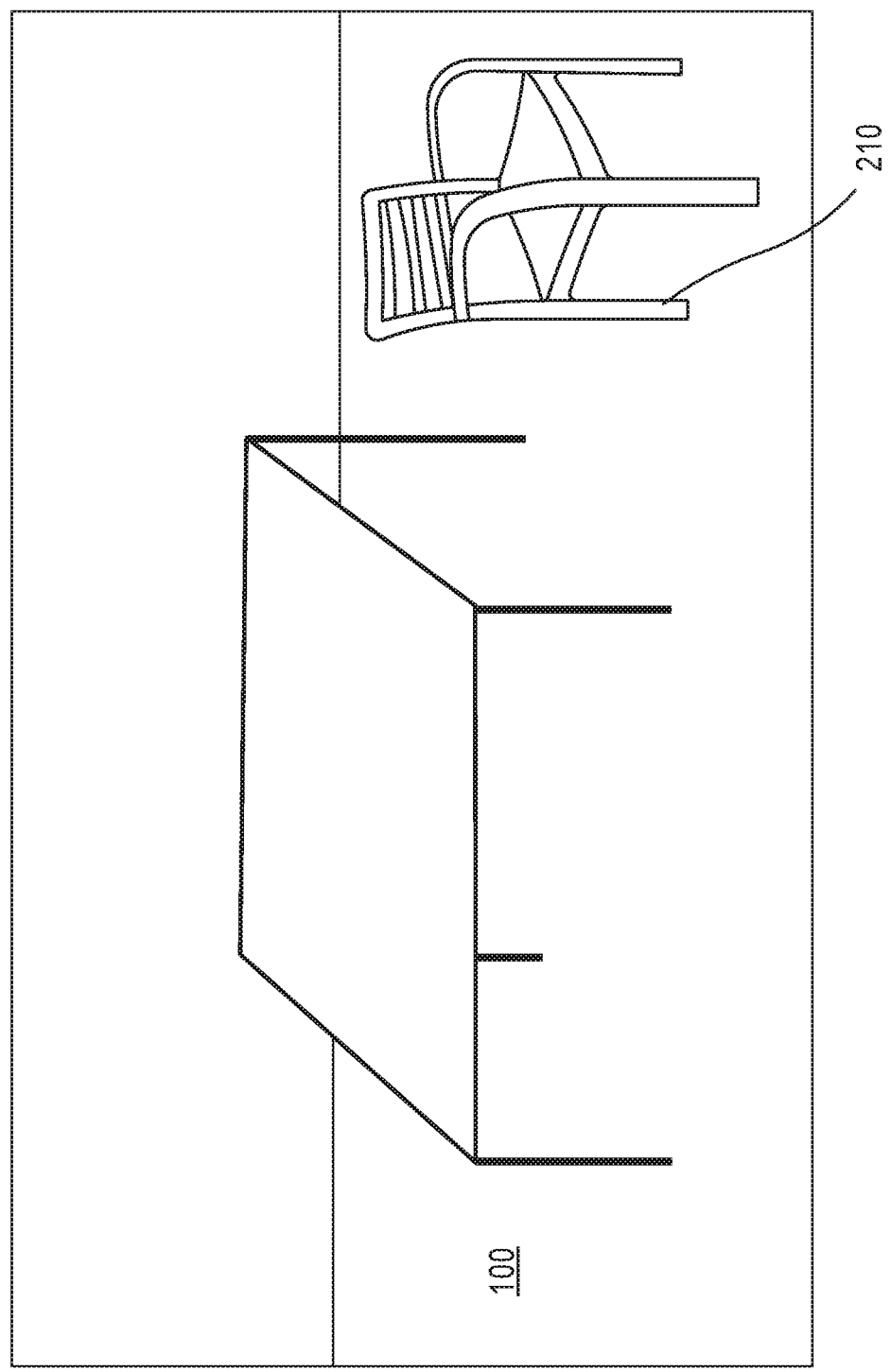
FIG. 2 illustrates an example of gradually introducing imagery corresponding to a real-world object into a virtualized environment, in accordance with certain embodiments of the present invention.

Next, if the person/obstacle continues to approach the user (or the user continues to approach the person/obstacle), the headset can render an outline of the approaching person/obstacle within the virtualized environment. For example, a computer processor or controller of the headset may be configured to render the outline after the person/obstacle arrives within distance $d_2$ of the user. FIG. 2 illustrates an example of gradually introducing imagery of a real-world object, by rendering an outline. In the example of FIG. 2, a user may be immersed in virtualized environment 100. As an obstacle (such as a chair) comes within a predetermined distance (such as within distance $d_2$) of the user, the headset may render an outline of the chair 210 within virtual environment 100.

Although the example of FIG. 2 illustrates gradually introducing imagery of a chair by rendering an outline, other embodiments may gradually introduce imagery of a real-world object by introducing imagery of varying transparency. For example, real-world objects/persons/obstacles that are farther away may appear to be very transparent, while real-world objects/persons/obstacles that are nearer to the user may appear opaque within the virtualized environment. Certain embodiments may not use distinct, discrete thresholds. Instead, certain embodiments may gradually introduce imagery (i.e., gradually and continuously modify the transparency of the imagery) as a function of the distance between the corresponding object and the user in the real world.

In view of the above, imagery may be introduced in whatever gradual manner to the user that is deemed appropriate, in order to avoid disorienting the user, and in order to avoid intruding upon the user's interactions with the virtualized environment.

Figure 3:
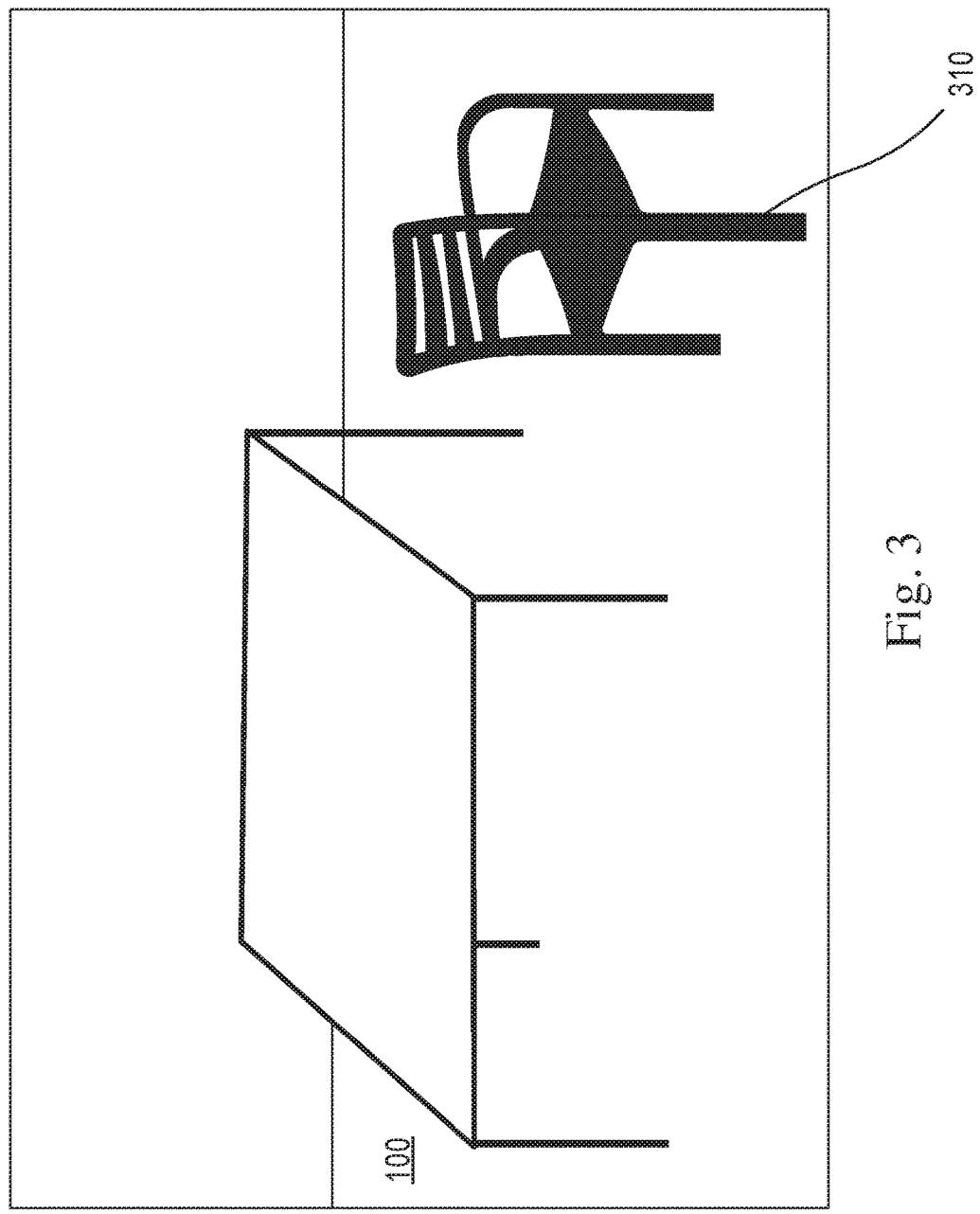
FIG. 3 illustrates another example of gradually introducing imagery corresponding to a real-world object, in accordance with certain embodiments of the present invention.

Third, if the distance between the user and the person/obstacle continues to be reduced, the headset may be configured to fully render the person/obstacle within the virtual environment. For example, in the event that the person/obstacle arrives within distance $d_1$ of the user, certain embodiments may fully render imagery of the person/obstacle in the virtualized environment. For example, certain embodiments may fully render imagery of the person/obstacle in the virtualized environment in the event that a collision is imminent. FIG. 3 illustrates another example of gradually introducing imagery of a real-world object. In the example of FIG. 3, the distance between the obstacle (such as a chair) and the user may continue to become smaller, and thus the headset may fully render the chair 310 within virtualized environment 100.

Additionally, different embodiments of the present invention may allow users to set different parameters to determine distances $d_1$, $d_2$, and/or $d_3$. Certain embodiments may also allow a user to configure how the person/obstacle is to be rendered in the virtual environment. The parameters may also reflect when and how the rumbling notification is to occur.

In view of the above, with certain embodiments, when a user uses a headset, a sharp corner in the furniture (i.e., an obstacle) may first appear as an outline, and then appear as a fully-rendered object within the virtual environment. Thus, the user may avoid collision with furniture, and the user may avoid hurting himself/herself.

Figure 4:
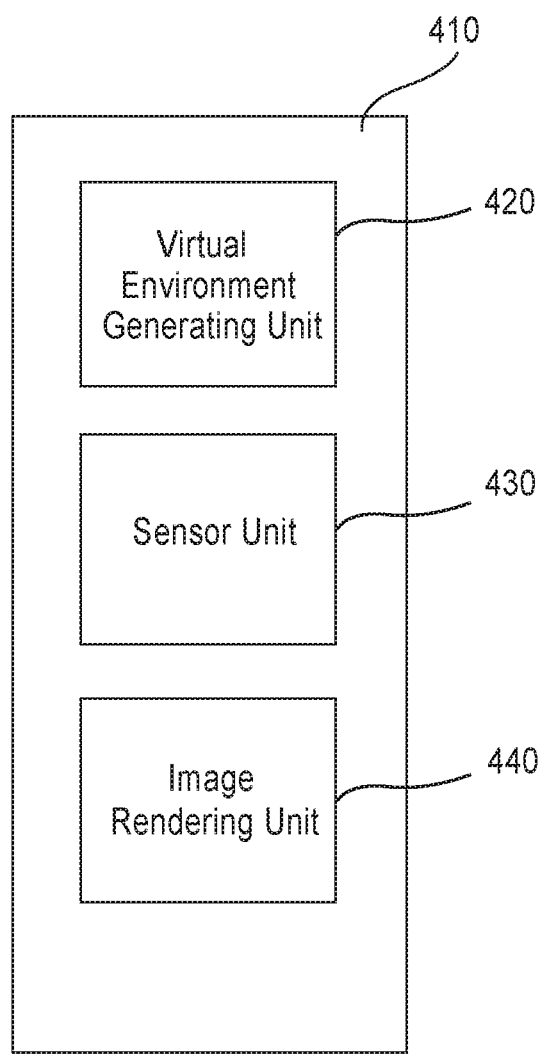
FIG. 4 illustrates a system that presents imagery within a virtualized environment, in accordance with certain embodiments of the present invention.

FIG. 4 illustrates a system 410 that presents imagery within a virtualized environment, in accordance with certain embodiments of the present invention. The units of example system 410 may be integrated within a virtual reality headset. Alternatively, certain units of example system 410 may be separate from the virtual reality headset. The system 410 of FIG. 4 may include a virtual environment generating unit 420 that generates a virtualized environment, a sensor unit 430, and an image rendering unit 440, in accordance with certain embodiments of the invention. The sensor unit 430 may determine whether objects are in the vicinity of the user. As described above, sensor unit 430 may determine the physical dimensions of the objects, identify the objects, and/or determine the distances between the user and the objects, for example. Sensor unit 430 may also capture real-world imagery of the objects. Image rendering unit 440 may render imagery corresponding to the real-world objects as described above.

Figure 5:
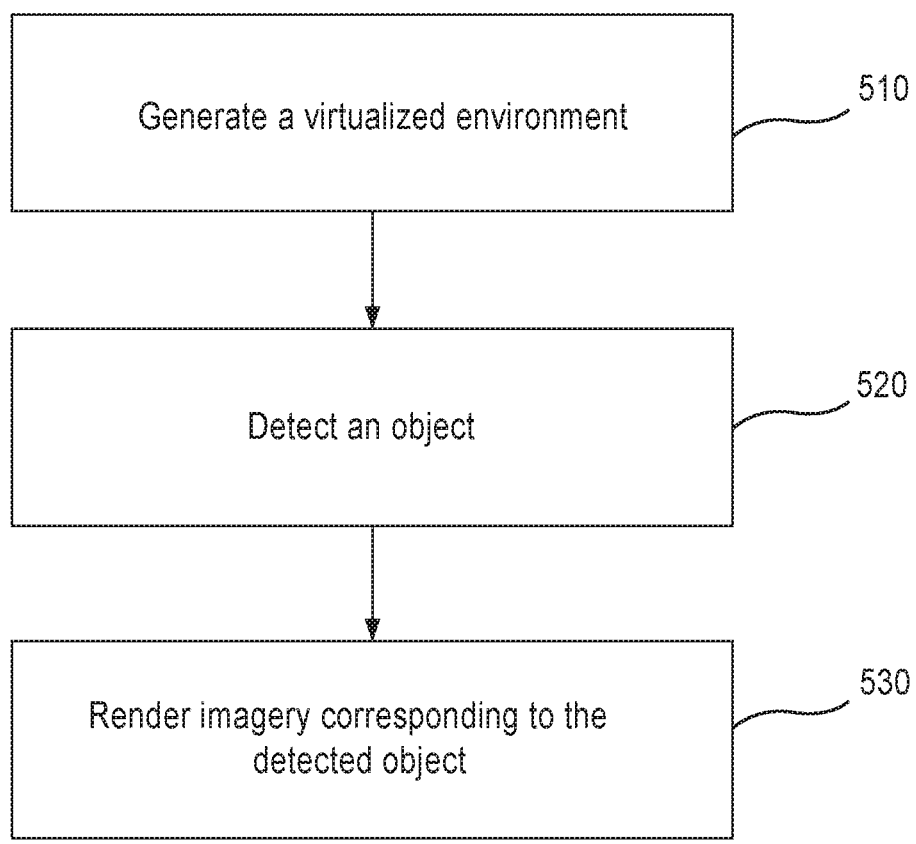
FIG. 5 illustrates a flowchart of a method in accordance with certain embodiments of the invention.

FIG. 5 illustrates a flowchart of a method in accordance with certain embodiments of the invention. The method illustrated in FIG. 5 includes, at 510, generating, by a virtual reality device, a virtualized environment for a user. The method may also include, at 520, detecting an object in the real world. The method may also include, at 530, rendering imagery corresponding to the detected object in the virtualized environment.

Figure 6:
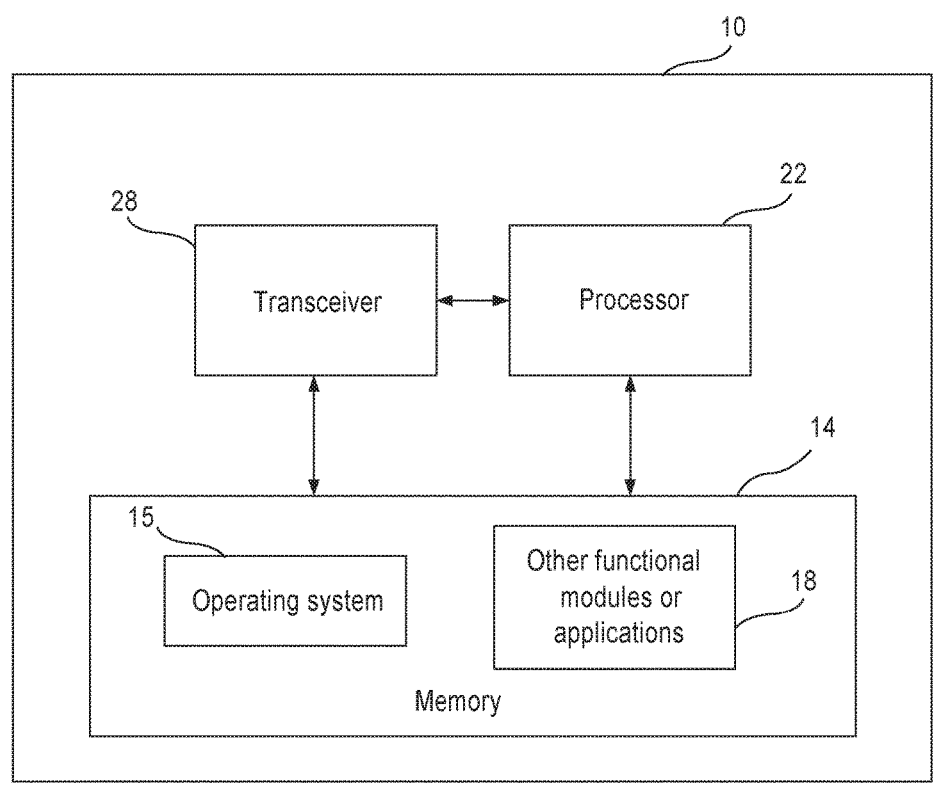
FIG. 6 illustrates an apparatus in accordance with certain embodiments of the invention.

FIG. 6 illustrates an apparatus 10 according to certain embodiments of the present invention. It should be understood that each block in FIG. 5 may be implemented by various means or their combinations, such as hardware, software, firmware, one or more processors and/or circuitry.

Figure 7:
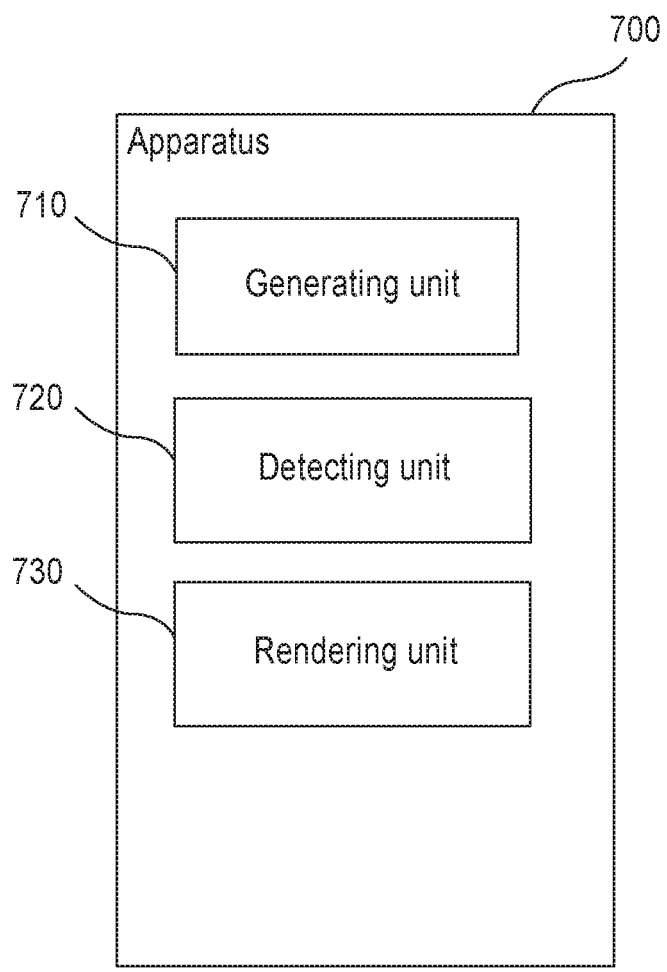
FIG. 7 illustrates another apparatus in accordance with certain embodiments of the invention.

In an embodiment, apparatus 10 may be a device that generates the virtualized environment (such as a headset or some other virtual reality device), for example. In another embodiment, apparatus 10 may be a device that implements functions of the system which may be separate from the device that generates the virtualized environment. Apparatus 10 may also be configured to operate as any of the virtual environment generating unit 420, sensor unit 430, and/or image rendering unit 440, as shown in FIG. 4. In addition, apparatus 10 may be configured to operate as any of the components of the apparatus 700, as shown in FIG. 7, including the generating unit 710, the detecting unit 720, and the rendering unit 730. Although only one apparatus 10 is shown in FIG. 6, more than one apparatus 10 may be implemented together in various combinations as a system or independently.

Apparatus 10 includes a processor 22 for processing information and executing instructions or operations. Processor 22 may be any type of general or specific purpose processor. While a single processor 22 is shown in FIG. 6, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein, including that illustrated in FIG. 5.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be configured to generate a virtualized environment to a user. Apparatus 10 may also be configured to detect an object in the real world. Apparatus 10 may also be configured to render imagery corresponding to the detected object in the virtualized environment.

FIG. 7 illustrates another apparatus in accordance with certain embodiments of the invention. Apparatus 700 can be a headset or some other virtual reality device, for example. Apparatus 700 can include a generating unit 710 that generates a virtualized environment for a user. Apparatus 700 can also include a detecting unit 720 that detects an object in the real world. Apparatus 700 can also include a rendering unit 730 that renders imagery corresponding to the detected object in the virtualized environment.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
   generating, by a virtual reality device, a virtualized environment for a user;
   detecting an object in the real word; and
   rendering imagery corresponding to the detected object in the virtualized environment, wherein the rendering the imagery corresponding to the detected object is based on a determined distance between the user and the object,
   wherein when the user is at a first distance from the object, the rendering comprises generating only an outline of the object, and
   wherein when the user is at a second distance closer to the object than the first distance, the rendering comprises generating a fully rendered image of the object based on the outline.

2. The method of claim 1, wherein the generating the virtualized environment comprises using real-world imagery.

3. The method of claim 1, further comprising capturing real-world imagery of the object in the real world,
   wherein the rendering the imagery corresponding to the detected object comprises using the captured real-world imagery.

4. The method of claim 1, wherein the detecting the object comprises determining a distance between the user and the object.

5. The method of claim 1, further comprising providing an alert that the detected object is within a predetermined distance from the user.

6. An apparatus, comprising:
   at least one processor; and
   at least one memory including computer program code,
   wherein the at least one memory and the computer program code are configured to, with the at least one processor, cause the apparatus at least to:
   generate a virtualized environment for a user;
   detect an object in the real world; and
   render imagery corresponding to the detected object in the virtualized environment, wherein the rendering the imagery corresponding to the detected object is based on a determined distance between the user and the object,
   wherein when the user is at a first distance from the object, the rendering comprises generating only an outline of the object, and
   wherein when the user is at a second distance closer to the object than the first distance, the rendering comprises generating a fully rendered image of the object based on the outline.

7. The apparatus of claim 6, wherein the generating the virtualized environment comprises using real-world imagery.

8. The apparatus of claim 6,
   wherein the at least one memory and the computer program code are configured to, with the at least one processor, cause the apparatus at least to capture real-world imagery of the object in the real world, and
   wherein the rendering the imagery corresponding to the detected object comprises using the captured real-world imagery.

9. The apparatus of claim 6, wherein the detecting the object comprises determining a distance between the user and the object.

10. The apparatus of claim 6, wherein the at least one memory and the computer program code are configured to, with the at least one processor, cause the apparatus at least to provide an alert that the detected object is within a predetermined distance from the user.

11. A computer program, embodied on a non-transitory computer-readable medium, the computer program, when executed by a processor, causes the processor to:
   generate a virtualized environment for a user;
   detect an object in the real world; and
   render imagery corresponding to the detected object in the virtualized environment, wherein the rendering the imagery corresponding to the detected object is based on a determined distance between the user and the object,
   wherein when the user is at a first distance from the object, the rendering comprises generating only an outline of the object, and
   wherein when the user is at a second distance closer to the object than the first distance, the rendering comprises generating a fully rendered image of the object based on the outline.

12. The computer program of claim 11, wherein the generating the virtualized environment comprises using real-world imagery.

13. The computer program of claim 11,
   wherein the computer program, when executed by the processor, further causes the processor to capture real-world imagery of the object in the real world, and
   wherein the rendering the imagery corresponding to the detected object comprises using the captured real-world imagery.

14. The computer program of claim 11, wherein the detecting the object comprises determining a distance between the user and the object.

15. The computer program of claim 11, wherein the computer program, when executed by the processor, further causes the processor to provide an alert that the detected object is within a predetermined distance from the user.

* * * * *